United States Patent [19]
Patois et al.

[11] Patent Number: 5,553,698
[45] Date of Patent: Sep. 10, 1996

[54] CONVEYOR BELT APPARATUS FOR BOTTLES

[75] Inventors: John R. Patois, Wayne, N.J.; Jack D. Warren, Oshkosh, Wis.

[73] Assignee: J and J Container Handling Systems, Little Falls, N.J.

[21] Appl. No.: 365,558

[22] Filed: Dec. 28, 1994

[51] Int. Cl.$^6$ ................................................. B65G 15/14
[52] U.S. Cl. ..................................... 198/626.1; 198/626.6
[58] Field of Search ................................ 198/678.1, 681, 198/626.1, 626.5, 626.6, 817, 604

[56] References Cited

U.S. PATENT DOCUMENTS

| | | |
|---|---|---|
| 1,535,785 | 4/1925 | Luce . |
| 2,862,606 | 12/1958 | Schlichting . |
| 3,124,231 | 3/1964 | Ott, Jr. . |
| 3,289,867 | 12/1966 | Burke . |
| 3,706,369 | 12/1972 | Ishida et al. . |
| 3,840,111 | 10/1974 | Randrup . |
| 3,848,864 | 11/1974 | Dwyer et al. ................. 198/626.1 X |
| 3,850,284 | 11/1974 | Roberts . |
| 3,931,881 | 1/1976 | Bickel et al. ................. 198/626.1 X |
| 3,978,971 | 9/1976 | Conrow et al. . |
| 3,978,979 | 9/1976 | Mezey . |
| 4,114,347 | 9/1978 | Morris et al. . |
| 4,230,223 | 10/1980 | Flatnik . |
| 4,422,541 | 12/1983 | Lisec . |
| 4,479,574 | 10/1984 | Julius et al. . |
| 4,802,571 | 2/1989 | Born et al. . |
| 4,807,421 | 2/1989 | Araki et al. . |
| 4,823,940 | 4/1989 | Cretser . |
| 4,927,004 | 5/1990 | Leaton . |
| 5,094,340 | 3/1992 | Avakov ................. 198/626.1 |
| 5,145,055 | 9/1992 | Kondo . |

FOREIGN PATENT DOCUMENTS

| | | | |
|---|---|---|---|
| 0916997 | 8/1954 | Germany ........................ | 198/626.1 |
| 3932392 | 4/1991 | Germany ........................ | 198/626.6 |
| 2211810 | 7/1989 | United Kingdom ............... | 198/626.1 |

OTHER PUBLICATIONS

Burrell Leder, Beltech, Inc., Publication, Volta Fabrication Center Marietta, GA.

IBM Technical Disclosure Bulletin, "Conveyor Belt", vol. 8 No. 6, Nov. 1965.

Primary Examiner—James R. Bidwell
Attorney, Agent, or Firm—Weingram & Zall

[57] ABSTRACT

A conveyor apparatus is provided which includes a pair of conveyor belts constructed from a resilient material and arranged to securely grip and release the neck ring of bottles to be conveyed. Each one of the conveyor belts is formed with a groove having coacting opposed sides. The opposed sides part to open the groove to facilitate and expedite receiving the bottle neck ring in the grooves of the conveyor belts. The opposed sides of the groove then coact to close the groove and securely grip the neck ring therebetween to transport the bottle. At the discharge area of the conveyor line, the opposed sides once again flex away from the groove to facilitate and expedite the discharge of the bottle from the groove of the conveyor belts.

31 Claims, 2 Drawing Sheets

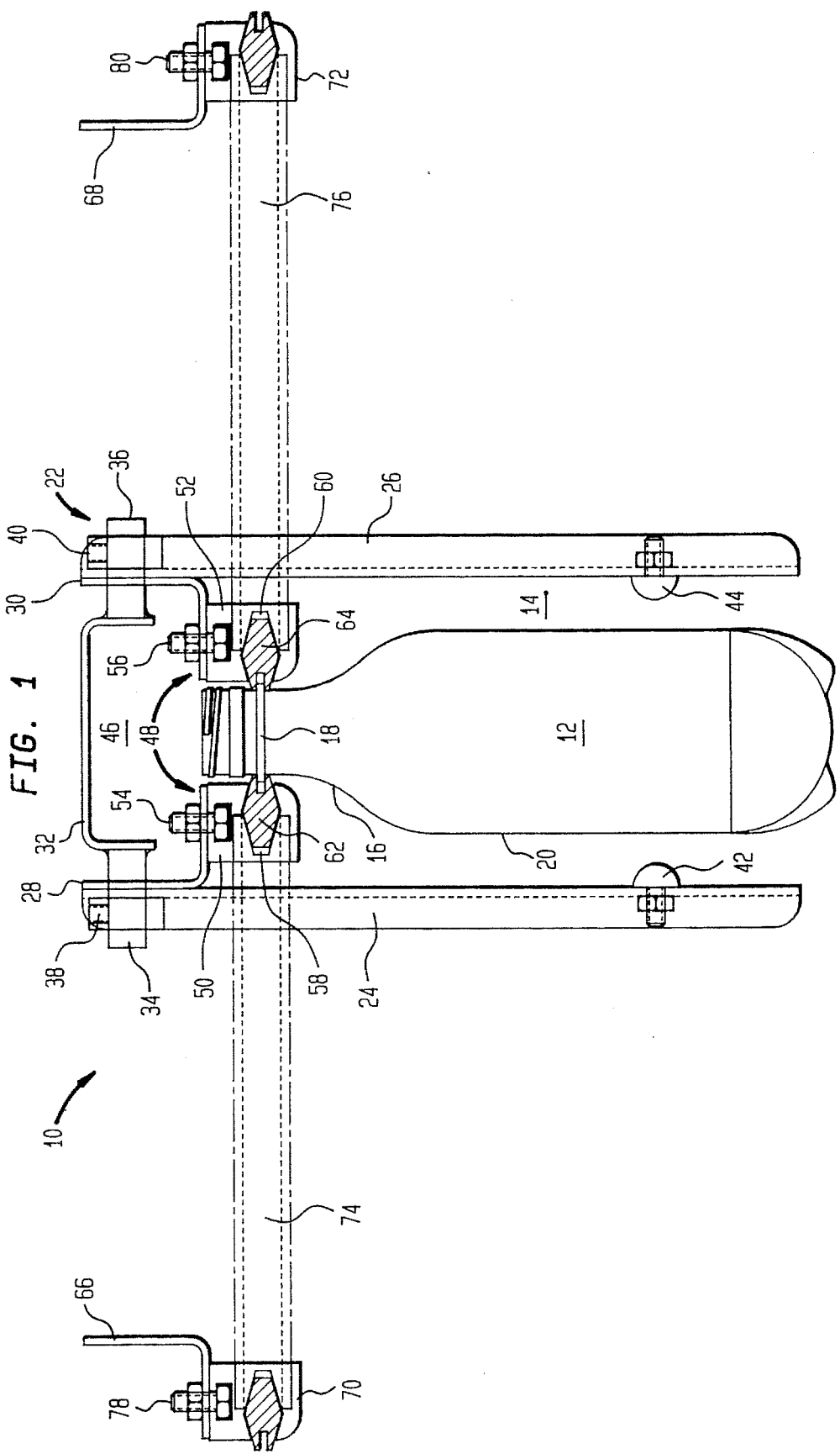

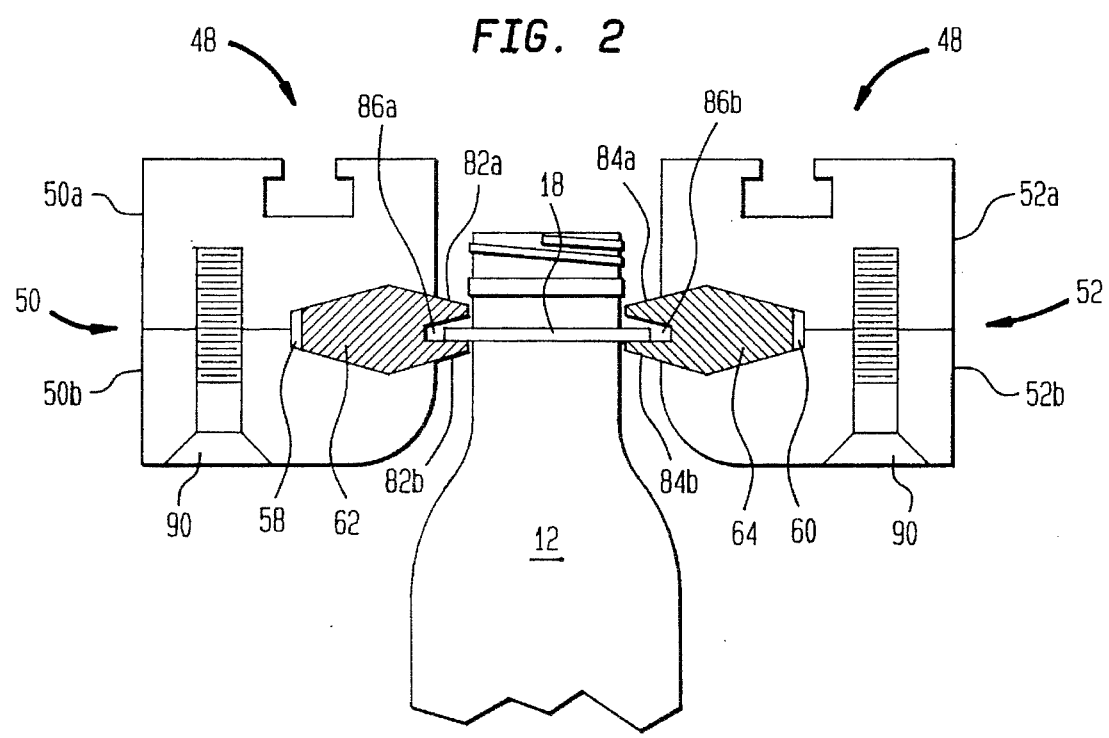

CONVEYOR BELT APPARATUS FOR BOTTLES

BACKGROUND OF THE INVENTION

1. Field of the Invention

This invention relates to apparatus and methods which employ belts constructed and arranged to transport bottles, particularly polyethylene terephthalate ("P.E.T.") bottles, along a conveyor line.

2. Description of the Related Art

Apparatus and methods are known to transport objects between work stations. Certain apparatus are provided with conveyor belts and chains to move a variety of different objects.

For example, U.S. Pat. No. 3,124,231 to Ott, Jr. discloses a mechanism to transfer articles vertically, in particular fragile articles such as bulbs or lamps. The mechanism includes a pair of spaced endless belts provided with flexible resilient protuberances, such as parallel ribs or cleats of rubber, which grip the article at its maximum diameter.

U.S. Pat. No. 3,840,111 to Randrup discloses a chain conveyor to engage directly cartons or other containers. The conveyor includes a deflector assembly which is employed to twist the chain about its longitudinal axis for as much as ninety degrees (90°). The deflector assembly consists of deflector sheaves between which an intermediate sheave is disposed. Each one of the sheaves has a chain-receiving groove at it's periphery.

U.S. Pat. No. 3,978,971 to Conrow., et al. discloses a bulb accumulator consisting of a pair of parallel round belts which suspend the bulbous portion of each bulb so that the cullets portion is pendent. The belts may be a polyurethane material. The bulbs are transported to another pair of opposing cleated belts which grip the bulbs from opposing sides and move them forward continuously. A drag strip beneath the parallel round belts contacts the cullets of the bulbs to incline the bulbs away from the direction of travel which causes the bulbs to stack or accumulate so that each bulb is substantially supported by the proceeding bulb.

U.S. Pat. No. 4,422,541 to Lisec discloses an apparatus for conveying insulted glass panes and which consists of a pair of L-shaped supports which extend inwardly under the individual panes. The supports are provided with pressure contact jaws to contact an outside surface of the panes for a reliable conveyance and are moved by a pair of conveyor chains along an underlying guide rail for each support.

U.S. Pat. No. 4,479,574 to Julius, et al. discloses a container transport apparatus for plastic bottles and which consists of a plurality of rigid, elongated container guide members which surround the containers and guide them as they pass through the transport apparatus. A pair of conveyor belts moves the bottles along the guide members. A guide support for the guide members and the conveyor belt is provided with a cutout portion to permit passage of the return portion of the belts. The guide member is a generally flat rectangular structure with a sloping end portion having a circular aperture cut away to permit a portion of the belt to project outside the sloping end portion and contact the side wall of the bottle.

U.S. Pat. No. 4,802,571 to Born, et al. discloses an apparatus for conveying suspended bottles and which consists of two conveyor belts moved next to one another in a single guide bar which is mounted in the conveyor housing. A conveyor belt is provided upon which the neck bead of the bottle is loosely supported, with play, to be conveyed. An adjustable rail with an adjustable guide strip is provided to vertically position the bottles when conveyed and to accommodate the lateral dimensions of the bottles.

U.S. Pat. No. 4,807,421 to Araki, et al. discloses equipment for handling containers and which consists of a flexible holding member centrally formed with a hole divided into tongues which extend radially inward acting to hold the container in place in the center of the holder.

U.S. Pat. No. 4,823,940 to Cretser discloses a conveyor for flat articles, such as printed circuit boards, and which includes an endless conveyor belt disposed on its edge to pass around a pulley provided with a lower, laterally outwardly projecting flange forming a lower guide surface for the lower edge of the associated pulley. An upstanding generally U-shaped guide for the belt forms an elongated groove extending between end pulleys.

U.S. Pat. No. 4,927,004 to Leaton discloses an apparatus for feeding and discharging discrete objects such as gem stones and which includes two conventional toothed belts which pass around top pulleys and bottom pulleys. Each belt carries a series of equispaced containers formed of a flexible material such as polyurethane rubber.

U.S. Pat. No. 5,145,055 to Kondo discloses a conveyor device for printed circuit boards and which includes a pair of spaced apart endless roller chains each of which is guided by a guide rail. A plurality of support members fixed to the chains to move therewith have a clamp plate member rockably mounted on each of the support members to move between opened and closed positions and cooperate with the corresponding support member to clamp the side edge portion of the circuit board therebetween when the clamp plate member is in the closed position.

Among these inventions, however, none provide for variable gripping of the bottle neck ring to ensure controlled, efficient movement of each bottle along the conveyor line. Although the Julius and Born, et al. patents disclose belts which contact the walls of the bottle and upon which the bottle neck rings are loosely supported with play, respectively, these conveyor belts are less efficient and determinative of the positive gripping pressure employed to transport the bottles than the present invention. This is an important concern in those situations where the conveyor apparatus is elevated off the assembly line floor. It is important to have the bottles securely gripped so that there is virtually no possibility of these objects jamming or falling onto the production floor and personnel below.

In addition, none of the these patents disclose a simplified apparatus with conveyor belts to be constructed with a groove defined by resilient material to engage and release the bottles as does the present invention. The conventional systems, such as Born, et al., restructure the guide slot at the inlet and outlet regions of the apparatus to receive and discharge the bottles. This is a more complicated structure than that of the present invention, and requires more space and is more expensive.

The cross section of the conveyor belts of the present invention is adapted to retain the belts in their support blocks regardless of the speed at which they are driven during conveyor operations.

SUMMARY AND OBJECTS OF THE INVENTION

A conveyor apparatus for bottles is provided which includes a housing comprising a guide path therein. The guide path includes an inlet area, an outlet area, and an intermediate transport area. A support means extends between the inlet area and the outlet area of the guide path, the support means including a channel formed therein which extends along the length of support means. A conveying means according to the present invention is disposed in the channel of the support means for movement along the channel. The conveying means includes a pair of endless belts formed from resilient material and horizontally disposed in the channel, each of the belts having an external surface in which a groove with opposed sides is formed and supported to form a pair of oblong continuous paths, the adjacent portions of the pair of oblong continuous paths forming a guide path; support means disposed above and below each of the adjacent portions of the pair of oblong continuous pads, the support means coacting with the resiliency of said continuous belt to urge and allow movement of the opposed sides of the grooves toward and away from each other to grip and release an item between in the groove between the opposed sides.

The present invention also provides a method of conveying bottles employing the conveying means of the present invention.

It is an object of the present invention to provide an apparatus which is simple in structure and operation to perform the required task.

It is another object of the present invention to provide a conveying apparatus which is durable and relatively economical to operate.

It is another object of the present invention to provide a conveyor apparatus which is easily maintained and/or repaired in a relatively quick amount of time and which reduces the cost to build, operate and maintain the conveyor apparatus.

It is another object of the present invention to provide a conveyor apparatus which is adapted to carry the bottles off the floor of the facility in which the conveyor apparatus is disposed.

It is another object of the present invention to provide a conveyor apparatus which is constructed and arranged to carry the bottles in an empty state.

It is another object of the present invention to provide a conveyor apparatus having an endless belt with moveable gripping jaws to positively secure and position the bottles during transport along the conveyor line.

It is another object of the present invention to provide a conveyor apparatus which includes means for controlling the position of the moveable gripping jaws to engage and hold the bottle neck ring and to release the ring at predetermined positions to allow for accumulation of the bottles.

It is another object of the present invention to provide a conveyor apparatus which provides resilient means to engage, hold or accumulate and release items conveyed along the conveyor line.

It is an object of the present invention to provide a conveyor belt apparatus to transport bottles in a secure and efficient manner by substantially reducing, if not eliminating, bouncing, grouping, jumping, jamming or stoppage of the bottles along the conveyor line.

It is another object of the present invention to provide a continuous groove in an external surface of the conveyor belts between the jaws to facilitate receiving the bottles at the entry area of the conveyor line and discharging the bottles at the discharge area of the conveyor line.

Is a another object of the present invention to provide a conveyor apparatus having conveyor belts which are self-lubricating and have a cross-sectional shape that retains the belts in their respective support assemblies throughout all operational speeds.

It is another object of the present invention to provide a conveyor belt with a cross-sectional shape formed to securely retain the conveyor belt in the straight and curved running areas of a carrying channel.

It is another object of the present invention to provide a method for carrying empty and light-weight bottles in a secure and accurately positioned condition along the conveyor line.

It is another object of the present invention to provide a method for positively engaging and disengaging the conveying means of the present invention to and from a bottle neck ring automatically without any separate control devices, electrical circuits or other automated actuators.

It is another object of the present invention to provide a method for controlling the size of a gripping means for the conveying means to positively engage and hold the bottle neck ring during transport and disengagement from the conveyor line.

It is another object of the present invention to provide a method for varying the extent of the gripping force on the bottle neck ring along the path of the conveyor line.

It is another object of the present invention to provide a method for holding the empty bottles in a uniform condition without requiring bottles to contact each other in order to move each other along the conveying path.

It is another object of the present invention to provide a method for holding each bottle independently of the remaining bottles in the conveyor line.

It is another object of the present invention to provide a method for preventing bouncing, bunching or movement of the bottles other than that of the necessary movement along the conveyor path.

BRIEF DESCRIPTION OF THE DRAWINGS

For a more complete understanding of the present invention, reference may be had to the following description of an exemplary embodiment of the present invention considered in connection with the accompanying drawings, in which:

FIG. 1 is an elevational view of a conveyor apparatus provided with conveyor belts according to the present invention shown in cross-section for transporting bottles along a conveyor line; and FIG. 2 is an elevational view, partially in cross-section of the preferred embodiment of the conveyor belts according to the present invention coacting at positions representative of the entry and discharge areas of the conveyor line.

DETAILED DESCRIPTION OF THE PREFERRED EMBODIMENT

In FIG. 1, the conveyor apparatus 10 according to the present invention is shown in a preferred embodiment for transporting bottles 12, e.g. polyethylene terephthalate (P.E.T.) bottles, used for beverages, such as soda, along a conveyor line 14. A neck portion 16 of the bottle 12 is formed with a flange 18 or ring radially projecting from the surface of the bottle 12. The neck portion 16 of the bottle 12 extends to a broader bulbous cylindrical body portion 20 to contain the bulk of the beverage product (not shown).

The apparatus 10 includes a housing 22 which consists of rail brackets 24,26 arranged in spaced apart relationship at opposed sides of the conveyor line 14. An upper end of each one of the rail brackets 24,26 is constructed and arranged to receive a corresponding one of a pair of angle brackets 28,30. The rail brackets 24,26 and the angle brackets 28,30 are provided with apertures constructed and arranged for registration with each other. A cover 32 having opposed end portions 34,36 extends over the conveyor line 14. Each one of the opposed end portions 34,36 is adjustably received in a corresponding one of the rail brackets 24,26 and angle brackets 28,30. Shaft collars 38,40 adjustably mount the opposed end portions 34,36 of the cover 32 to the rail brackets 24,26. With this arrangement, the shaft collars 38,40 permit the rail brackets to be moved away from the conveyor line 14 to accommodate bottles 12 having different sizes and shapes. Guide rails 42,44 are adjustably mounted to a corresponding one of the rail brackets 24,26 with mechanical fasteners.

The cover 32 and rail brackets 24,26 coact to form a conveyor path 46 in which the conveyor assembly 48 of the apparatus 10 is disposed for receiving, transporting and discharging the bottles 12. The cover prevents foreign matter, debris and direct light from entering the guide path 46 and the bottles.

The conveyor assembly 48 consists of a pair of blocks 50,52, preferably of the extruded type. The blocks 50,52 are suspended beneath the angle brackets 28,30 by mechanical fastening means 54,56 extending through the angle brackets 28,30 and into the blocks 50,52.

The blocks 50,52 extend horizontally in spaced apart relationship along the length of the guide path 46. Each one of the blocks 50,52 is provided with a channel 58,60 in which endless conveyor belts 62,64 formed from resilient material are disposed for movement. The channels 58,60 have a cross section which preferably conforms to the shape of the conveyor belts 62,64.

In FIG. 1, the conveyor belts 62,64 have a cross section approximating a truncated diamond shape to facilitate disposing and moving each one of the belts in a corresponding one of the channels 58,60. The truncated diamond shape of the belts 62,64 is preferred because it securely holds the belts 62,64 in the corresponding channels 58,60 of the blocks 50,52 regardless of the speed at which the belts 62,64 are being run. Operation of the conveyor apparatus 10 according to the present invention is not limited to belts having a truncated diamond shape cross-section. The belts 62,64 are self-lubricating and preferably are formed from a material that has a low coefficient of friction.

Additional angle brackets 66,68 at each side of the conveyor line support return blocks 70,72 which coact with sheaves 74,76 around which the continuous conveyor belts 62,64 travel. Mechanical fastening means 78,80, such as those using a nut and bolt arrangement, support each one of the return blocks 70,72 in a suspended position beneath the angle brackets 66,68.

FIG. 1 shows the conveyor assembly 48 of the conveyor apparatus 10 in operation during the transport stage of the bottles 12.

Referring also to FIG. 2, an inner or conveying edge of each one of the belts 62,64 is tapered to a pair of opposed lip or jaw members 82a,82b and 84a,84b which extend from the channels 58,60 and continuously along the length of the respective belt. The cross-section of the belts 62,64 and the perspective of the drawing appears to show the lips as "finger-like" members. In actuality, each one of the lips extends along the length of the respective one of the belts 62,64. Grooves 86a,86b are formed to extend along a corresponding one of the conveyor belts 62,64 between a corresponding pair of the lips 82a,82b and 84a,84b. In effect, the lips at each one of the belts are the opposed sides of the corresponding groove therebetween. The coaction between the lips 82a,82b and 84a,84b and corresponding grooves 86a,86b provide for engagement and release of the bottle neck rings 18 at the conveyor apparatus 10 in an efficient, secure manner which is discussed further hereinafter.

FIG. 2 shows the conveyor assembly 48 of the present invention. In order to more fully appreciate the apparatus according to the present invention, reference is also made to FIG. 1, where each one of the lips 82a,82b, and 84a,84b securely grips a corresponding side, i.e. a top or a bottom surface, of the bottle neck ring 18 to transport the bottle 12 along the transport stage of the conveyor line 14. There is no movement of the bottle 12 when the neck ring 18 is securely gripped between the coacting lips 82a,82b and 84a,84b. There is therefore, no bunching, grouping, jiggling or jamming normally associated with bottles that are moved having a frictional contact only with a surface of the conveying belts.

The spacing between the conveying edge of each belt extending into the guide path 46 is such that the bottle neck ring 18 and body portion 20 do not interfere with the operation of the apparatus 10.

In contrast to what is shown in FIG. 1, FIG. 2 shows the upper lips 82a,84a angled upwards to avoid contact with the bottle neck flange or any portion of the bottle 12. The lower lips 82b,84b have moved from a lower position into a position to contact the underside of the bottle neck ring 18 and the wall of the bottle 12. This positioning of the lips 82a,82b and 84a,84b with respect to the bottle neck ring 18 is representative of their position at both the inlet and discharge areas of the conveyor line 14. The resiliency of the belt material permits the lips 82b,84b to be somewhat lower than the ring 18 at the inlet area. This reduces the possibility of the lips 82b,84b being level with or higher than the bottleneck bead at the inlet area so that the lips 82b,84b do not prevent the bottleneck ring from being received in the grooves 86a,86b.

At the inlet and discharge areas of the conveyor line 14, the blocks 50,52 are constructed and arranged to permit the resiliency of the upper lips 82a,84a to flex slightly upward, preferably at an angle of approximately 20 degrees (20°). As shown in FIG. 2, this permits the top lips 82a,84a to resume their predisposed position, i.e. angled upwards. With both lips 82a,84a angled upwards, the bottles 12 are received quickly and assuredly therebetween the lips 82a,82b and 84a,84b at the entrance to the conveyor line.

As the belts 62,64 continue their rotational movement along the corresponding channels 58,60, the structure of the blocks 50,52 forces the lips 82a,82b and 84a,84b toward the corresponding grooves 86a,86b to grip the bottle neck ring 18. Accordingly, the top and bottom lips 82a,84a and 82b,84b, respectively, of each one of the belts 62,64 coact to securely grip the bottle neck ring 18 therebetween as shown in FIG. 1.

As the bottle 12 approaches the discharge end of the conveyor line 14, an action similar to that which occurred at the inlet area takes place. That is, the belts 62,64 come to a portion of the conveyor line 14 where the lips 82a,82b and 84a,84b are no longer constricted by a corresponding one of the blocks 50,52 so that the lips are permitted to part or move away from the grooves. This permits the bottle 12 to be quickly and effectively released from the belts and removed to a subsequent station, e.g. another conveyor line, etc. As each one of the belts 62,64 continues around a corresponding one of the sheaves 74,76 to a return position, the lips 82a,84a are in an unconstricted state so that the lips 82a,82b and 84a,84b are immediately ready to receive the bottles.

FIG. 2 also shows an alternative embodiment of the construction of the blocks 50,52. In FIG. 2, the blocks are formed from two extruded portions. For example, the block 50 is formed from portions 50a, 50b which are separably mounted together by a mechanical fastening means 90 such as a screw. The block 52 is also formed from portions 52a,52b which are separably mounted together by a mechanical fastening means 90 such as a screw. The block portion 50a is formed to define a first region of the channel, while the block portion 50b is formed to define a second region of the channel. Similarly, the block portion 52a is formed to define a first region of the channel 60, while the block portion 52b is formed to define a second portion of the channel 60. The portions 50a,50b and 52a,52b are releasably engaged to each other with the mechanical fastening means 90 to accommodate conveyor belts of different sizes or to replace damaged belts.

The conveyor belts 62,64 are preferably constructed from urethane belting of size "A" and are well suited for self-lubrication. Of course, other belting with a low coefficient of friction may be used with the conveyor apparatus 10 of the present invention.

The sheaves 74,76 are preferably eight inches in diameter for commercial applications, although other diameters can be employed depending on the particular operation and conveyor belting used.

The blocks 50,52 permit the apparatus 10 of the present invention to function as a variable pressure gripping device. The grooves 86a,86b in the belts are closed by the coacting lip portions 82a,82b, and 84a,84b to grip opposed sides of the bottle neck ring 18 along the transport stage of the conveyor line 14. The blocks 50,52 are constructed and arranged to permit the top lips 82a,84a to move upwards and the bottom lips 84b,86b to move downwards which opens the groove at the inlet and discharge stages to facilitate loading and unloading of the bottles 12 onto and from the conveyor line 14, without complicated construction of these areas of the conveyor apparatus 10.

It will be understood that the embodiments described herein are merely exemplary and that a person skilled in the art may make many variations and modifications without departing from the spirit and scope of the invention. All such modifications and variations of the invention are intended to be covered in the appended claims.

What is claimed is:

1. A conveyor apparatus for bottles, comprising:
   a housing comprising:
      a guide path therein, the guide path including:
         an inlet area,
         an outlet area, and
         a transport area intermediate the inlet area and the outlet area;
   a support block extending between the inlet area and the outlet area of the guide path, the support block comprising:
      a first portion formed to define a first region of a support path,
      a second portion formed to define a second region of the support path, and
      fastening means connecting the first portion to the second portion to provide coaction between the first region and the second region to form the support path; and
   conveying means disposed for movement in the support path, the conveying means comprising:
      a groove extending along the length of the conveying means, the groove having opposed sides with an inherent resiliency and constructed and arranged to extend from the support path to open the groove when the conveying means is in the inlet area and the outlet area, and to close the groove when the conveying means is in the transport area.

2. The conveyor apparatus according to claim 1, wherein the conveying means is a flexible belt.

3. The conveyor apparatus according to claim 1, further comprising:
   adjusting means connected to the housing and the block to adjust the size of the guide path of the housing.

4. The conveyor apparatus according to claim 1, wherein the support block further comprises:
   a bracket having a first end connected to the housing and
   a second end extending to the support block at the guide path.

5. The conveyor apparatus according to claim 1, wherein the housing further comprises:
   a pair of guide brackets connected to the housing at opposed sides of the guide path; and
   a pair of guide rails, each one of the pair of guide rails adjustably mounted to a corresponding one of the guide brackets at opposed sides of the guide path.

6. The conveyor apparatus according to claim 1, further comprising:
   a cover extending across the guide path over the underlying bottles.

7. A conveyor apparatus for bottles, comprising:
   a housing comprising:
      a guide path therein, the guide path including:
         an inlet area,
         an outlet area,
         a transport area intermediate the inlet area and the outlet area,
         a pair of guide brackets connected to the housing at opposed sides of the guide path, and
         a pair of guide rails, each one of the pair of guide rails adjustably mounted to a corresponding one of the guide brackets at opposed sides of the guide path;
   support means extending between the inlet area and the outlet area of the guide path, the support means comprising:
      a support path formed therein which extends along the length of the support means, and
   conveying means disposed in the support path of the support means for movement along the support path, the conveying means comprising:
      a groove extending along a length of the conveying means, the groove having opposed sides with an inherent resiliency and constructed and arranged to open the groove when the conveying means is in the inlet area and the outlet area, and to close the groove when the conveying means is in the transport area.

8. A conveying means, comprising:
   a housing comprising:
      a guide path therein,
      an inlet area to the guide path,
      an outlet area from the guide path, and
      a transport area intermediate the inlet area and the outlet area;
   a pair of endless belts formed from a resilient material, each one of the pair of endless belts comprising:

an external surface, and a groove formed in the external surface, the groove having opposed sides resilient to be urged apart, wherein each one of the pair of endless belts is supported at the guide path to form a pair of oblong continuous paths with adjacent portions of the oblong continuous paths forming a conveying path along which an object is conveyed;

support means extending between the inlet area and the outlet area of the guide path, the support means comprising:

a pair of angle brackets connected to the housing and extending to opposed sides of the guide path, a pair of blocks, each one of the blocks connected to a corresponding one of the angle brackets to extend to a corresponding side of the guide path, each block comprising:

a first portion defining a first region of the conveying path, and a second portion defining a second region of the conveying path, the support means disposed above and below each one of the adjacent portions of the pair of oblong continuous paths, the support means coacting with the endless belts to urge and allow movement of the opposed sides of the grooves toward and away from each other to move the opposed sides of the grooves to grip and release an item therebetween;

fastening means connecting the first portion to the second portion of each block to provide coaction between the first region and the second region to form the support path;

adjusting means connected to the housing and the support means to adjust the size of the guide path in the housing, the adjusting means comprising:

a pair of side rails, each one of the pair of side rails mounted to a corresponding side of the housing to extend along a corresponding side of the guide path, a pair of guide rails, each one of the pair of guide rails mounted to a corresponding one of the side rails and being adjustable therewith to project into the guide path to a predetermined distance; and a cover extending across the guide path above the pair of endless conveyor belts.

9. A conveying system for bottles, comprising:

an endless belt formed from a resilient material and movable along a guide path, the endless belt comprising:

an external surface, a groove formed in the external surface; and a support member for supporting the endless belt along the guide path, the support member comprising:

a channel formed in the support member along the guide path, the channel constructed and arranged to capture the endless belt in the channel as the endless belt moves along the channel, and adapted to restrict movement of the endless belt in opposed lateral directions perpendicular to the path of travel of the endless belt.

10. The conveying system according to claim 9, wherein the groove in the endless belt comprises:

opposed sides constructed to be resiliently urged apart.

11. The conveying system according to claim 9, wherein the support member has an external surface, the width of the channel at the external surface of the support member being less than the greatest width of the channel within the support member.

12. The conveying system according to claim 9, wherein the channel in the support member terminates at edges disposed at both sides of the intersection of the channel and the exterior surface of the support member to prevent the endless belt from being displaced from a select position within the channel into the guide path.

13. The conveying system according to claim 9, wherein the channel terminates at a second location remote from the intersection of the channel and the exterior surface of the support member to prevent the endless belt from being displaced from a select position within the channel away from the guide path.

14. The conveying system according to claim 9, wherein the support member further comprises:

means for adjusting a size of the channel, the adjusting means operatively engaging the support member to arrange the channel to conform to a portion of the external surface of the endless belt for capturing the endless belt within the channel.

15. The conveying system according to claim 9, wherein the support member further comprises:

a first support portion constructed and arranged to conform to a first portion of a first side of the external surface of the endless belt, and a second support portion constructed and arranged to conform to a second portion of a second side of the endless belt opposite to the first side for coaction with the first support portion to capture the endless belt within the channel.

16. The conveying system according to claim 15, wherein the first support portion defines a first region of the channel, and the second support portion defines a second region of the channel, the first support region and the second support region extending in opposite directions.

17. The conveying system according to claim 16, wherein the first support region and the second support region are constructed and arranged to extend simultaneously in opposite directions.

18. The conveying system according to claim 10, wherein one side of the opposed sides of the groove coacts with the support member to permit movement of the one side of the groove toward and away from an opposite side of the groove for gripping and releasing an object therebetween.

19. A conveying system, comprising:

a pair of endless belts formed from a resilient material, each one of the pair of endless belts comprising:

an external surface, and a groove formed in the external surface, the groove having opposed sides, the opposed sides of the groove constructed to be resiliently urged apart, the pair of endless belts supported in a spaced apart relationship with parallel adjacent portions facing each other for forming a conveying path;

a support member for each one of the pair of endless belts, the support member comprising:

a first support portion disposed at a first side of the endless belt, the first support portion having a first surface defining a first region, a second support portion disposed at a second side of the endless belt opposite the first side, the second support portion having a second surface defining a second region, a horizontal path disposed between the first region and the second region;

wherein the first region faces toward the conveying path and the first surface conforms to a portion of the exterior surface of the endless belt facing the conveying path to capture the endless belt in the horizontal path and prevent the endless belt from moving into the conveying path, and wherein the second region faces away from the conveying path and the second surface conforms to a portion of the exterior surface of the endless belt facing away from the conveying path to capture the endless belt in the horizontal path and prevent the endless belt from moving away from the conveying path.

20. The conveying system according to claim 19, wherein the first region and the second region of the horizontal path are constructed and arranged to extend in opposite directions.

21. The conveying system according to claim 20, wherein the first region and the second region extend simultaneously in opposite directions.

22. The conveying system according to claim 21, further comprising:

adjustable fastening means interconnecting the first support portion to the second support portion, the adjustable fastening means constructed and arranged to adjust the first surface with respect to the second surface to position the first region and the second region of the horizontal path to conform substantially to the shape of the exterior surface of the endless belt.

23. The conveying system according to claim 22, wherein the adjustable fastening means comprises:

a mechanical fastener threadably engaging the first support portion and the second support portion to provide adjustment therebetween.

24. The conveying system according to claim 19, wherein a lower one of the opposed sides of the groove for the endless belt is constructed and arranged for an object to be supported thereon and extend downward into the conveying path during conveyance by the pair of endless belts.

25. The conveying system according to claim 19, wherein the first support portion and the second support portion coact to provide the horizontal path with predetermined dimensions for capturing the endless belt.

26. The conveying system according to claim 19, wherein one side of the opposed sides of the groove coacts with the first support portion of the support member to permit movement of the one side of the groove toward and away from an opposite side of the groove for gripping and releasing an object therebetween.

27. A method of conveying an object along a conveyor line, the method comprising the steps of:

supporting an endless belt along a horizontal path adjacent a conveying path;

capturing the endless belt in the horizontal path;

retaining the captured endless belt within the horizontal path and from entering the conveying path;

adjusting a size and shape of the horizontal path to conform to a portion of an exterior surface of the captured endless belt;

guiding the endless belt along the horizontal path at a side of the conveying path; and restricting movement of the endless belt in opposed lateral directions perpendicular to the path of travel of the endless belt.

28. The method according to claim 27, further comprising the steps of:

opening a sidewall of the endless belt to provide a groove to face the conveying path;

passing the opened sidewall of the groove alongside an object to be conveyed; and closing the sidewall of the groove to grip an object therebetween for conveyance.

29. The method according to claim 28, further comprising the step of:

opening the sidewall of the groove to release the object from the endless belt.

30. The method according to claim 29, further comprising the step of:

supporting the endless belt from a position above and below the endless belt.

31. The method according to claim 30, further comprising the step of:

adjusting the support for the endless belt to control opening and closing of the groove.

* * * * *